Patented July 1, 1924.

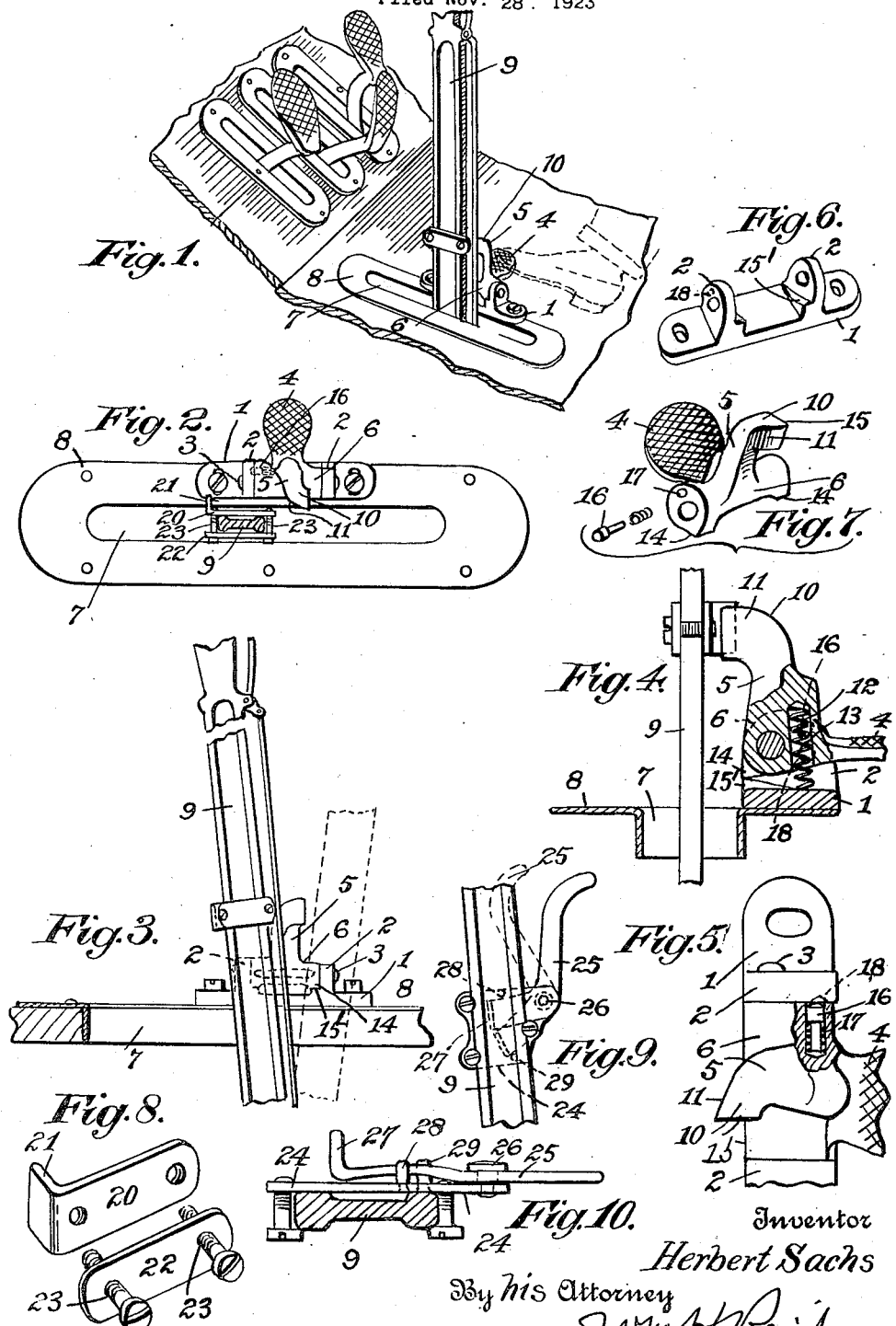

1,499,948

UNITED STATES PATENT OFFICE.

HERBERT SACHS, OF BRONX, NEW YORK.

AUTO BRAKE SAFETY CATCH.

Application filed November 28, 1923. Serial No. 677,406.

*To all whom it may concern:*

Be it known that I, HERBERT SACHS, a citizen of the United States, and a resident of the Bronx, in the county of Bronx and State of New York, have invented certain new and useful Improvements in Auto Brake Safety Catches, of which the following is a specification.

This invention has reference to a safety device for preventing the return of a brake lever to its free position when in the locked position. The object of the invention is to provide a device of this character that will automatically place itself in position to prevent return movement of the brake lever to the normal free position when the lever has been placed in the brake-locking position, should for any reason the normal ratchet or other means that holds the brake lever in the locked position of the brake, become released.

A further object of the invention is to provide for disabling the said locking means so that the brake lever will swing entirely free thereof.

In the accompanying drawing showing embodiments of my invention, Figure 1 shows a portion of a motor vehicle with the device in use.

Fig. 2 is a plan view, in section through the brake lever.

Fig. 3 shows a side elevation.

Fig. 4 shows enlarged a side view, partly in section.

Fig. 5 is a plan view, partly in section as shown in Fig. 4.

Fig. 6 shows the base member.

Fig. 7 shows the angle lever.

Fig. 8 shows the clamp with the stop piece.

Fig. 9 shows a shiftable stop piece.

Fig. 10 is a view enlarged of the parts shown in Fig. 9.

The invention is especially designed for use with the arrangement in the Ford automobile, where there is an emergency brake lever, and also in which a certain pedal is pressed by a spring to rear position in which the high speed clutch band is in engagement; which said pedal when pressed forward the full distance will cause engagement of the low speed clutch band, and which pedal in an intermediate position will cause both said bands to be free, which is a neutral position. In such car the brake lever when locked will also hold the said pedal in the neutral position. This will permit the car to be stopped with the motor running and it can be left standing in such condition. But it sometimes happens that the emergency brake lever will slip its ratchet and move forward, which will permit the said pedal to move rearward from the neutral position to the high speed position, that would tend to start the car with no one in it, with dangerous results.

To avoid this condition I provide a safety catch in addition to the usual ratchet emergency brake lever, that when the brake lever is pulled back the said catch will stand in front of such brake lever, and will absolutely prevent this brake lever from returning to normal free position to thereby release said clutch pedal, should said normal locking means of the brake lever slip or release the brake lever. When it is desired to start the car, an arm on said catch is engaged by the operator that will shift this safety catch and permit the return of the brake lever to normal free position; thereby releasing the said clutch pedal.

The device comprises essentially a base member and an angle lever. The base comprises a strip 1 having trunnion portions 2, apertured to receive a spindle 3. The angle lever comprises an arm 4 that extends out beyond the base over the floor, for engagement by the operator and preferably has a roughened top face as indicated. This lever has also an upstanding arm 5 both of which arms are connected with the body 6 containing a bore to receive the shaft 3, that will mount the lever in the trunnion portions 2 as indicated in Fig. 2. The base is mounted at one side of the slot 7 in the floor, preferably on the slotted strip 8 that is secured to the floor board in the usual construction, and this will bring the upright arm 5 adjacent the path of movement of the brake lever 9, that extends upward and swings back and forth in the usual manner. To cause engagement with the brake lever I provide a lug 10 at the upper part of this arm that has an inclined face 11 arranged to be engaged by the brake lever 9, or a member thereon, when the lever is swung to the rear to set the brake. This engagement of the inclined face will move the lever back and depress the foot arm 4, that is normally pressed upwardly by a coil spring 12 arranged in a socket 13 in the body, and which engages the base by its lower end, see Fig. 4. A stop portion 14 on the body will engage a stop portion 15' on the base to limit its movement by the spring 12. As soon as the lever moves back in the slot beyond the lug 11, the angle lever will return to normal position, and the lug will have its flat abutment face 15 in position to engage the brake lever 9 when it again moves forward. Should the brake lever when set in the rear position with the brake locked slip its ratchet and tend to move forward it would strike the shoulder 15 and be prevented from further forward movement. But when the operator desires to release the brake and move the lever 9 forward, the arm 4 is depressed by the foot that will swing the lug 11 down to the path of the brake lever and give it free movement.

If desired means may be provided to hold the angle lever in the free position when depressed by the foot, and I provide in one of these two members, the angle lever or the base, a spring plunger that will engage a socket in the other member to retain the lever in this position. As shown in Fig. 5, I provide a spring plunger 16 in a socket 17 in the body of the base, that is pressed into a socket 18, see Fig. 6, in the trunnion member 2, when the arm 2 is depressed to bring the lug out of position for engagement with the brake lever. When foot arm 4 is partly depressed sufficient to permit the brake lever 9 to pass the lug this spring plunger will not engage; but when the arm 4 is depressed the full distance this spring plunger will enter its socket and hold the lever in this position with the lug 15 free from engaging the brake lever or any part thereof, the spring plunger having sufficient force to overcome the spring 12 that would return the angle lever to normal position. But the operator can place the foot under the pedal 4 and start it upward and then the spring 12 will return this lever to normal position.

While the lug 15 on the foot lever can directly engage the brake lever 9, I preferably provide a stop piece on the brake lever. As shown in Figs. 2 and 8 I provide a bar 20 having a stop piece or lug 21 at one end, which bar is clamped by a strip 22 and bolts 23 on the brake lever, surrounding it, as clearly shown in Fig. 2. This is placed on the lever 9 so that the stop piece 21 will engage the lug 11 in the manner I have described. But by loosening the bolts 23 this stop piece can be shifted up or down on the brake lever out of position for engagement with the lug 11, that in the arrangement shown will not then engage the brake lever.

Another arrangement for this purpose provides a swinging arm on the brake lever, as shown in Figs. 9 and 10. In this construction a strip 24 has a lever 25 pivoted thereon at 26, and carries a stop lug 27 that in the full position in Fig. 9 engaging a pin 28, will cooperate with the lug 11. But when the lever 25 is swung toward the brake lever 9, the stop lug 27 will be shifted out of position for engagement with the lug 11 on the angle lever, and the brake lever can then swing free of this device. This position of the lever 25 is limited by a stop pin 29.

It will be seen that a device of this character can be applied to any form of a brake lever by merely attaching the base strip to the floor adjacent the path of the lever; and can be used to directly engage the brake lever, or can operate in connection with a stop piece rigidly or movably attached to the brake lever by suitable clamping means.

What I claim is:

1. A safety catch for a brake-lever, comprising a block having a base for attachment to the floor and trunnion portions to form a bearing, an angle lever pivoted in said trunnions with one arm extending out over the floor, a spring between said arm and the base tending to move the arm upwardly, the angle lever other arm projecting upwardly with a lug portion extending laterally towards the path of the brake-lever, said lug having one face inclined whereby the brake-lever engaging such face will swing the elbow lever back to pass beyond the lug and thereby compress said spring, whereby the elbow lever will be returned to former position, said lug also having an abutment face arranged to engage the brake-lever on its return, to prevent further return of the brake-lever until the elbow lever is swung by the said base arm.

2. A safety catch for a brake-lever, comprising a stop piece movably mounted on the brake lever, a block having a base for attachment to the floor and trunnion portions to form a bearing, an angle lever pivoted in said trunnions with one arm extending out over the floor, a spring between said arm and the base tending to move the arm upwardly, the angle lever other arm projecting upwardly with a lug portion extending laterally towards the path of the brake lever stop piece, said lug having one face inclined whereby the stop piece engaging such face will swing the elbow lever back to pass beyond the lug and thereby compress said spring whereby the elbow-lever will be returned to former position in the path of said brake lever stop piece, said lug also having an abutment face arranged to engage said stop piece on its return and prevent further return of the brake lever until the elbow lever is swung by said base arm, said stop piece being movable to a position in which its path on swing of the brake-lever will not engage said angle lever lug.

3. A safety catch for a brake-lever, comprising a block having a base for attachment to the floor and trunnion portions to form a bearing, an angle lever pivoted in said trunnions with one arm extending out over the floor, a spring between said arm and the base tending to move the arm upwardly, the angle lever other arm projecting upwardly with a lug portion extending laterally towards the path of the brake-lever, said lug having one face inclined whereby the brake-lever engaging such face will swing the elbow lever back to pass beyond the lug and thereby compress said spring, whereby the elbow lever will be returned to former position, and said lug also having an abutment face arranged to engage the brake-lever on its return, to prevent further return of the brake-lever until the elbow lever is swung by the said base arm, said block and angle lever being provided with a spring plunger in one of such members arranged to engage a socket in the other of such members whereby to retain said lug in a position out of the path of movement of the brake lever.

4. A safety catch for a brake-lever, comprising a block having a base for attachment to the floor and trunnion portions to form a bearing, an angle lever pivoted in said trunnions with one arm extending out over the floor, a spring between said arm and the base tending to move the arm upwardly, the angle lever other arm projecting upwardly with a lug portion extending laterally towards the path of the brake-lever, said lug having one face inclined whereby the brake-lever engaging such face will swing the elbow lever back to pass beyond the lug and thereby compress said spring, whereby the elbow lever will be returned to former position, said lug also having an abutment face arranged to engage the brake-lever on its return to prevent further return of the brake-lever until the elbow lever is swung by the said base arm, a supporting piece having means for attachment to the brake-lever, an arm pivoted on said supporting face normally in position for engagement with said lug, but shiftable away from said position to prevent engagement of said lug with the brake lever.

Signed at New York city, N. Y., on November 24, 1923.

HERBERT SACHS.